US011811867B2

(12) United States Patent
Patel et al.

(10) Patent No.: US 11,811,867 B2
(45) Date of Patent: Nov. 7, 2023

(54) DATA TRANSMISSION ROUTING BASED ON REPLICATION PATH CAPABILITY

(71) Applicant: International Business Machines Corporation, Armonk, NY (US)

(72) Inventors: Kushal S. Patel, Pune (IN); Rajsekhar Bharali, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 17/009,177

(22) Filed: Sep. 1, 2020

(65) Prior Publication Data
US 2022/0070255 A1  Mar. 3, 2022

(51) Int. Cl.
  *H04L 67/1095* (2022.01)
  *G06F 15/173* (2006.01)
  *H04L 43/0876* (2022.01)
  *H04L 49/90* (2022.01)
  *H04L 67/1097* (2022.01)

(52) U.S. Cl.
  CPC .... *H04L 67/1095* (2013.01); *G06F 15/17331* (2013.01); *H04L 43/0876* (2013.01); *H04L 49/90* (2013.01); *H04L 67/1097* (2013.01)

(58) Field of Classification Search
  CPC . H04L 67/1095; H04L 49/90; H04L 43/0876; H04L 67/1097; H04L 67/1076; H04L 43/0882; H04L 41/5019; H04L 67/02; H04L 43/0878; H04L 45/00; G06F 15/17331; G06F 15/173; H04W 40/00
  USPC ........................................................ 709/216
  See application file for complete search history.

(56) References Cited

U.S. PATENT DOCUMENTS

| 6,335,927 | B1* | 1/2002 | Elliott | H04L 63/083 370/352 |
| 7,418,003 | B1* | 8/2008 | Alvarez | H04L 12/185 370/466 |
| 7,480,817 | B2* | 1/2009 | Fan | H04L 67/1095 714/4.4 |

(Continued)

OTHER PUBLICATIONS

IBM, "IBM Spectrum Virtualize for Public Cloud overview," https://www.ibm.com/support/knowledgecenter/en/STHLEK_8.1.1/spectrum.virtualize.cloud.811.doc/svcl_svclicoverview.html, printed Apr. 23, 2020, 3 pgs.

(Continued)

*Primary Examiner* — James N Fiorillo
(74) *Attorney, Agent, or Firm* — Peter Suchecki

(57) ABSTRACT

Provided is a method, computer program product, and system for determining data transmission paths across storage systems based on replication path capability. A processor may collect buffer data from a source storage device and one or more target storage devices, the source storage device and the one or more target storage devices being communicatively coupled via a network. The processor may calculate, using the buffer data, a set of buffer capacities for a set of replication paths used for replicating data between the source storage device and the one or more target storage devices. The processor may correlate, using the set of buffer capacities, the set of replication paths with a set of tiered data to be replicated. Once correlated, the processor may select a first replication path for replicating a first tier of data from the set of tiered data.

14 Claims, 8 Drawing Sheets

(56) References Cited

U.S. PATENT DOCUMENTS

| | | | |
|---|---|---|---|
| 7,870,354 B2* | 1/2011 | Banks | H04L 67/1095 711/E12.103 |
| 8,332,860 B1 | 12/2012 | Yahalom | G06F 3/0605 718/104 |
| 8,935,612 B2* | 1/2015 | Bonner | H04L 67/1095 707/610 |
| 9,215,180 B1* | 12/2015 | Bertz | H04L 47/25 |
| 10,235,064 B1 | 3/2019 | Natanzon et al. | |
| 10,496,278 B1* | 12/2019 | O'Hare | G06F 3/0604 |
| 11,210,245 B2* | 12/2021 | Vokaliga | H04L 5/1446 |
| 2002/0004840 A1* | 1/2002 | Harumoto | H04N 21/6377 709/231 |
| 2002/0156840 A1* | 10/2002 | Ulrich | G06F 16/10 707/999.01 |
| 2003/0115316 A1* | 6/2003 | Yang-Huffman | H04M 15/8207 709/224 |
| 2005/0249115 A1* | 11/2005 | Toda | H04L 47/11 370/229 |
| 2007/0088763 A1* | 4/2007 | Yahalom | H04L 67/1095 |
| 2007/0185937 A1* | 8/2007 | Prahlad | G06F 16/184 |
| 2008/0031149 A1* | 2/2008 | Hughes | H04L 47/22 370/252 |
| 2009/0276476 A1* | 11/2009 | Jolly | G06F 16/10 |
| 2009/0276478 A1* | 11/2009 | Soman | G06F 12/0276 |
| 2011/0295806 A1* | 12/2011 | Erofeev | G06F 11/2094 707/634 |
| 2012/0185290 A1* | 7/2012 | Mueller | G06Q 10/06311 709/201 |
| 2015/0178014 A1* | 6/2015 | Nelson | G06F 3/067 711/114 |
| 2016/0191509 A1* | 6/2016 | Bestler | H04L 63/0876 713/193 |
| 2016/0359968 A1* | 12/2016 | Chitti | H04L 41/0896 |
| 2017/0220281 A1* | 8/2017 | Gupta | G06F 3/0604 |
| 2017/0295230 A1* | 10/2017 | Hatfield | H04L 49/253 |
| 2017/0366460 A1* | 12/2017 | Friedman | H04L 47/20 |
| 2017/0366467 A1* | 12/2017 | Martin | H04L 12/4625 |
| 2018/0124445 A1* | 5/2018 | Beili | H04N 21/84 |
| 2018/0260125 A1 | 9/2018 | Botes et al. | |
| 2019/0294582 A1* | 9/2019 | Zhu | H04L 67/1095 |
| 2019/0310773 A1 | 10/2019 | Radovanovic | |
| 2019/0319874 A1 | 10/2019 | Johnsen et al. | |
| 2020/0004685 A1* | 1/2020 | Guim Bernat | G06F 12/0897 |
| 2020/0076892 A1* | 3/2020 | Surcouf | H04L 67/1001 |
| 2020/0374348 A1* | 11/2020 | Spurlock | G06F 11/3055 |
| 2021/0297351 A1* | 9/2021 | Vegesna | H04L 49/90 |
| 2021/0303527 A1* | 9/2021 | Grunwald | G06F 16/1824 |
| 2021/0306166 A1* | 9/2021 | Piasetzky | H04L 12/4633 |
| 2022/0060422 A1* | 2/2022 | Sommers | H04L 47/2466 |
| 2022/0147253 A1* | 5/2022 | Sajeepa | G06F 3/0632 |
| 2022/0377823 A1* | 11/2022 | Elazzouni | H04W 76/14 |
| 2023/0137525 A1* | 5/2023 | Karr | H04L 67/1097 711/162 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

| Replication Path | Ethernet RDMA Buffer Capacity |
|---|---|
| 525 | 10MB |
| 520 | 26MB |
| 515 | 145MB |

| Data Object | Precedence |
|---|---|
| Volume_1 | High |
| Host_2 | Low |
| Volume_3 | High |
| Host_8 | Low |
| Host_1 AND Volume_18 | High |

DATA TRANSMISSION ROUTING BASED ON REPLICATION PATH CAPABILITY

BACKGROUND

The present disclosure relates generally to the field of data storage systems, and more specifically to determining data transmission paths across storage systems based on replication path and/or link capability.

With the enablement of remote direct memory access (RDMA) technology and high-speed interconnect protocols, cloud infrastructures have been utilizing RDMA over converged Ethernet (RoCE) capabilities for data replication in various storage environments. For example, these emerging Ethernet technologies over RDMA enable high speed/low latency connections that are optimal for replicating data from source to target locations in cloud computing environments.

SUMMARY

Embodiments of the present disclosure include a method, computer program product, and system for determining data transmission paths across storage systems based on replication path capability. A processor may collect buffer data from a source storage device and one or more target storage devices, the source storage device and the one or more target storage devices being communicatively coupled via a network. The processor may calculate, using the buffer data, a set of buffer capacities for a set of replication paths used for replicating data between the source storage device and the one or more target storage devices. The processor may correlate, using the set of buffer capacities, the set of replication paths with a set of tiered data to be replicated. Once correlated, the processor may select a first replication path for replicating a first tier of data from the set of tiered data.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
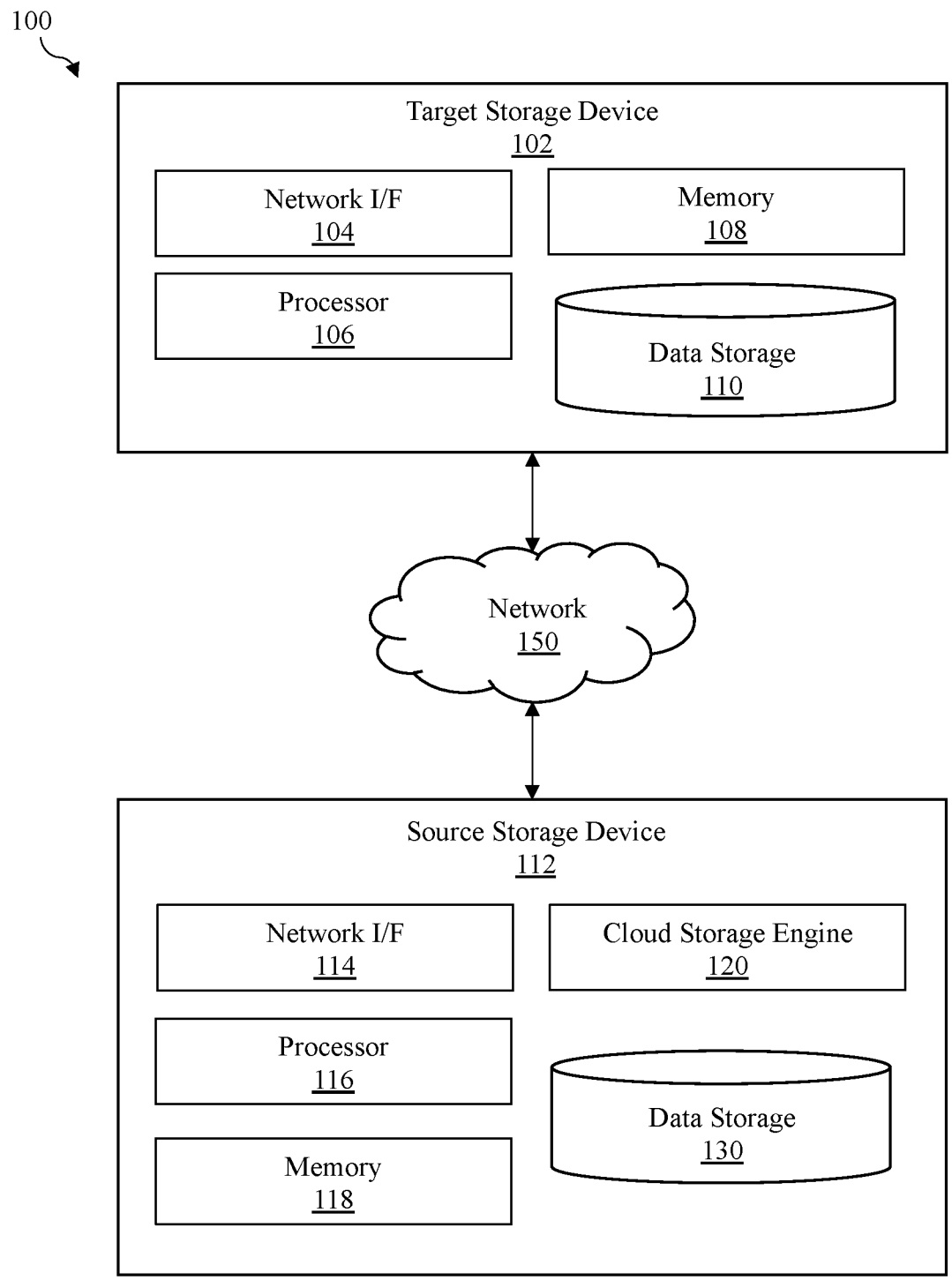
FIG. 1 illustrates a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of storage systems, and more particularly to determining data transmission paths across storage systems based on replication path capability. While the present disclosure is not necessarily limited to such applications, various aspects of the disclosure may be appreciated through a discussion of various examples using this context.

With the enablement of RDMA technology and high-speed interconnect protocols, cloud infrastructures have been utilizing RoCE capabilities for data replication in various storage environments. For example, these emerging Ethernet technologies over RDMA enable high speed/low latency connections that are optimal for replicating data from source to target locations in cloud computing environments (e.g., the cloud).

In a heterogeneous computing environment comprising various components such public cloud, private cloud, network entities (e.g., switches and routers), and/or various types of storages (e.g., enterprise storage, block storage, etc.), there are typically multiple connectivity paths (e.g., data replication paths) between the on-premises (on-prem) private cloud and off-premises (off-prem) public cloud that are accessible via various network devices. These paths are used to transfer input/output (I/O) traffic from one storage system to another storage system deployed over the cloud. For example, the I/O traffic could be host I/O traffic, backend I/O traffic, or replication I/O traffic across cloud instances of one or more storage virtualization engines.

In many instances, these multiple connectivity paths comprise dissimilar latencies and I/O performance characteristics that are caused by the various intermediate network components used. For example, the dissimilar latencies and the I/O performance characteristics of the intermediate network components of replication paths may be affected by various factors such as the number of hops due to multiple switches.

While synchronously replicating data between two or more storage systems of a cloud computing environment, two major issues may occur as a result of dissimilar latencies and/or I/O performance characteristics. First, there may be delayed acknowledgments of I/O data write operations. For example, as data is synchronously written to both of the storage locations (e.g., source and target), an application does not get the I/O write completion acknowledgement until both data copies are written on both storage locations.

As the storage virtualization instances in the cloud are connected using different paths having different I/O transmission capabilities, the I/O write operations may take dissimilar paths to reach the proper destination, hence latency may vary based on the path taken by the I/O operation used for replication. In an instance where the I/O write operation takes the slowest path, then the respective host application will experience increased I/O latency for its write operations.

A second issue may result because of inconsistent latencies of I/O data writes. For example, as the replication data is travelling through any of the cloud infrastructure connectivity paths (or replication paths), a path selection mechanism may send some of replication I/O operations to the fastest performing path and some replication I/O operations to slower performing paths. This may be dependent on the I/O routing techniques in the cloud. Typically, the data from source storage location to target storage location is sent via a preferred path that is calculated by a shortest path mechanism such as Dijkstra's Shortest Path Algorithm. These mechanisms determine the shortest connectivity path from source storage location to target storage location and may not take into account the speed at which data can be replicated (e.g., buffer capability, buffer capacity, etc.). In other instances, some cloud service providers (CSPs) use a multiple path approach (e.g., Round-Robin algorithm) to determine multiple shorter paths available to distribute the data replication load across multiple paths. However, these shorter paths may have dissimilar buffer availability/capacity across the components that create irregular I/O functionality when performing data replication.

For example, each time an I/O operation is sent, it uses a replication path which may be one of the shortest paths; however, it may not be the fastest path. For example, the respective path may have a congested network switch due to heavy I/O workloads by other tenants of a public cloud. Alternatively, there may be other replication paths accessible via other switches which may not be the shortest path, but may be faster than the other pre-determined paths. In many instances, there may be multiple remote-copy links that are registered with the storage system, such that I/O operations may take a random path to balance the load, but that random path may not necessarily be the fastest. This leads to inefficient and ineffective use of network resources and capabilities.

Embodiments of the present disclosure relate to a method, computer program product, and system for determining data transmission paths across storage systems based on replication path capability. In embodiments, a cloud storage engine may reside on a storage system or storage device that comprises multiple replication paths (e.g., remote copy links) between a source storage location and a target storage location. The cloud storage engine may determine buffer capacity (e.g., end-to-end RDMA buffer capacity) of the replication paths by collecting various buffer data/information (e.g., buffer size, buffer speed/bandwidth, buffer availability) from lower layers of the storage systems. Using the calculated buffer capacity for each of the replication paths, the cloud storage engine may select a replication path from the source storage location to the target storage location for synchronous replication.

In embodiments, selection of the replication path may be determined dynamically based on a data tier required for replication based on the source location's storage type. For example, a replication path having a higher buffer capacity may be selected for replicating a faster data tier (e.g., Solid State Drive (SSD) data), whereas a replication path having a lower buffer capacity may be selected for replication of a slower data tier (e.g., hard disk drive (HDD) data) or medium data tier (e.g., nearline storage data). In some instances, the slower data tier replication may utilize replication paths with higher buffer capacity when the replication path is underutilized by the faster data tier.

In embodiments, the buffer capacity will be automatically and continually calculated, and the storage system will be updated when any buffer capacity change is detected. For example, a change in buffer capacity may indicate a congested network switch and/or that a reconfiguration of replication paths has occurred. In this way, the cloud storage engine will continuously determine which paths have the highest buffer capacity and route the proper data tier through the respective paths while further decreasing latency by avoiding network congestion occurring on lower buffer capacity paths.

In embodiments, the system may allow for the selection of various replication priorities that can be configured for various replication types. For example, a priority adjustment or weighting algorithm may allow selective volume replication (e.g., volume logical block addressing (LBA)) via weighted replication paths having high layer-2 RDMA buffering and speed characteristics. In this way, Quality of Service (QoS) I/O operations may run dependably using the weighted replication paths. Further, using this approach balances the I/O workload across the replication paths in the cloud instances to provide better application performance.

The aforementioned advantages are example advantages, and not all advantages are discussed. Furthermore, embodiments of the present disclosure can exist that contain all, some, or none of the aforementioned advantages while remaining within the spirit and scope of the present disclosure.

Turning now to the figures, FIG. 1 illustrates a block diagram of an example computing environment 100 in which illustrative embodiments of the present disclosure may be implemented. In some embodiments, the computing environment 100 may include a target storage device 102 and a source storage device 112 that are configured to perform data replication across a plurality of replication paths and/or links.

Consistent with various embodiments, the target storage device 102 and the source storage device 112 may be computer systems. In some embodiments, the target storage device 102 and storage device 112 may be configured as virtual machines (VMs) and persist as cloud instances on a cloud computing environment. The target storage device 102 and the source storage device 112 may include one or more processors 106 and 116 and one or more memories 108 and 118, respectively. The target storage device 102 and the source storage device 112 may be configured to communicate with each other through an internal or external network interface 104 and 114. The network interfaces 104 and 114 may be, e.g., modems or network interface cards. The target storage device 102 and/or the source storage device 112 may be equipped with a display or monitor. Additionally, the target storage device 102 and/or the source storage device 112 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). The source storage device 112 may, in various embodiments, be connected to an output device. For example, the output device may be a tablet, an e-reader, or a printer. In some embodiments, the target storage device 102 and/or the source storage device 112 may be servers, desktops, laptops, or hand-held devices. For example, the target storage device 102 and the source storage device 112 may be cloud servers configured to retrieve and store data.

The target storage device 102 and the source storage device 112 may be distant from each other and communicate over a network 150. In some embodiments, the source storage device 112 may be a central hub from which target storage device 102 can establish a communication connection, such as in a client-server networking model. Alternatively, the source storage device 112 and target storage device 102 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an interne, or an intranet. In certain embodiments, the target storage device 102 and the source storage device 112 may be local to each other, and communicate via any appropriate local communication medium. For example, the target storage device 102 and the source storage device 112 may communicate using a local area network (LAN), one or more hardwire connections, a wireless link or router, or an intranet. In some embodiments, the target storage device 102 and the source storage device 112 may be communicatively coupled using a combination of one or more networks and/or one or more local connections. For example, the first target storage device 102 may be hardwired to the source storage device 112 (e.g., connected with an Ethernet cable) while a second target storage device (not shown) may communicate with the source storage device 112 using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150. In embodiments, network 150 may be substantially similar to the cloud computing environment 50 illustrated in FIG. 7.

In embodiments, the target storage device 102 and the source storage device 112 are configured to replicate various data over network 150, where data I/O operations are configured to read and write data to data storage 110 and/or data storage 130. Data storage 110 and/or data storage 130 may be any type of storage device. For example, data storage 110 and/or data storage 130 may be configured as a solid-state drive (SSD), a hard disk drive (HDD), a nearline storage drive, and the like. In embodiments, data storage 110 and data storage 130 may be configured as virtual storage and/or virtual block storage accessible in a cloud computing environment.

In embodiments, the target storage device 102 and the source storage device 112 may be communicatively coupled over network 150 through a plurality of replication paths and/or links (not shown) containing one or more network entities/devices such as switches and/or routers. For example, the source storage device 112 may be configured as an on-premises (on-prem) private cloud system that replicates data to an off-premises (off-prem) public cloud system (e.g., target storage device 102) through a series of network switches (e.g., switches 306 as detailed further in FIG. 3). In embodiments, these replication paths are used to transfer I/O traffic from one storage device to another storage device deployed over the cloud. For example, the I/O traffic could be host I/O traffic, backend I/O, or replication I/O traffic replicated across the cloud instances of a plurality of storage devices. For example, source storage device 112 may synchronously replicate SSD disk data over a replication path to target storage device 102.

In embodiments, the source storage device 112 includes cloud storage engine 120. In some embodiments, target storage device 102 may include cloud storage engine 120 and/or cloud storage engine 120 may be located on network 150 (e.g., configured as virtual engine or located on another storage device or compute node accessible through the cloud network, etc.). In embodiments, cloud storage engine 120 is configured to determine an end-to-end RDMA transmission buffer capacity for each of the plurality of data replication paths connected between target storage device 102 and source storage device 112. Once determined, cloud storage engine 120 can use the buffer capacity associated with each of the replication paths to select an appropriate path for synchronous data replication to improve system performance.

In embodiments, the path selected for replication may be based on the source storage device's disk type and/or the target storage device's disk type. For example, if an I/O write operation is received for a volume LBA located on an SSD, the cloud storage engine 120 will identify and select a replication path that has been determined to have a high buffer capacity since SSD data typically requires faster tier replication.

While FIG. 1 illustrates a computing environment 100 with a single source storage device 112 and a single target storage device 102, suitable computing environments for implementing embodiments of this disclosure may include any number of target storage devices and source storage devices. The various modules, systems, and components illustrated in FIG. 1 may exist, if at all, across a plurality of source storage devices and target storage devices.

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
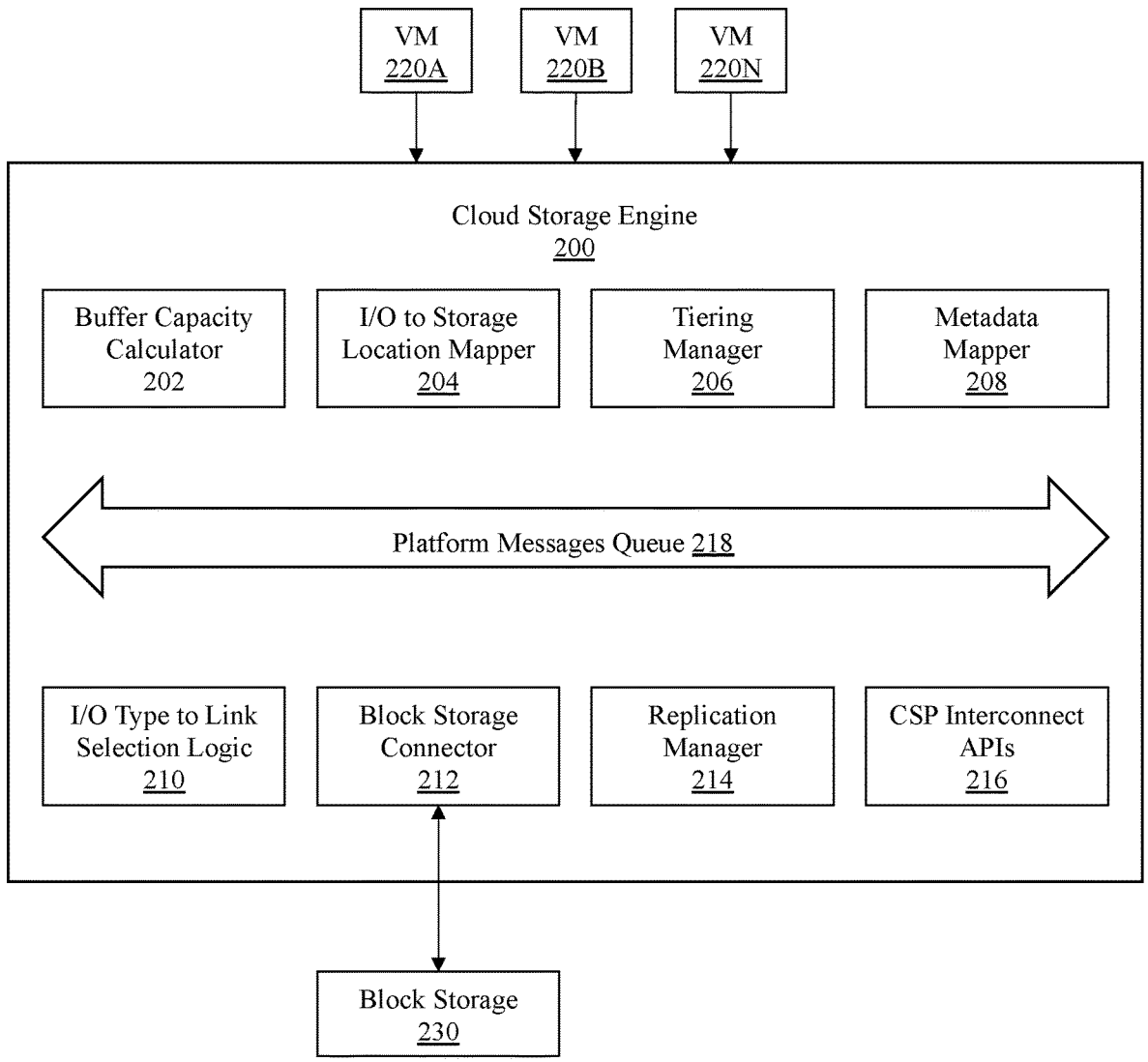
FIG. 2 illustrates a block diagram of an example cloud storage engine, in accordance with embodiments of the present disclosure.

Referring now to FIG. 2, shown is a block diagram of an example cloud storage engine 200, in accordance with embodiments of the present disclosure. In embodiments, cloud storage engine 200 may be located on one or more storage devices (e.g., source storage device 112). In embodiments, cloud storage engine 200 may be communicatively coupled to virtual machines (VM) 220A, VM 220B, and VM 220N (collectively referred to as VM 220) and block storage 230. Cloud storage engine 200 is configured to dynamically monitor and affect I/O write operations by selecting replication paths using a calculated buffer capacity, a disk type of the source storage device and target storage device, and quality of service (QoS) characteristics regarding the replication of data. In this way, the cloud storage engine 200 may improve latency of a storage system when replicating data and dependably run high-priority applications and I/O traffic under variable network conditions.

In embodiments, cloud storage engine 200 includes buffer capacity calculator 202, I/O to storage location mapper 204, tiering manager 206, metadata mapper 208, I/O type to link selection logic 210, block storage connector 212, replication manager 214, and CSP interconnect APIs 216 which may communicate with each other over platform messages queue 218.

Buffer capacity calculator 202 is configured to calculate buffer capacity of replication paths between one or more target storage devices and one or more source storage devices of a storage system. In embodiments, cloud storage engine 200 collects various buffer data (e.g., buffer volume/size, buffer speed, buffer bandwidth) from various lower layers (e.g., RDMA layer-2, iSCSI extensions for RDMA (iSER) initiator and virtualization layers, etc.) of the storage system to be used by the buffer capacity calculator 202 to calculate buffer capacity. For example, the buffer capacity may be determined by sending RDMA commands to the storage devices that collects all the RDMA buffer sizes in the paths from the source storage to target storage locations. In embodiments, this end-to-end transmission buffer capacity will be frequently calculated, and the storage system will be updated when any capacity change is detected. For example, each replication path may include differing I/O routing techniques that may lead to a faster or slower performing path resulting in a higher or lower calculated buffer capacity. In another example, cloud storage engine 200 may collect various buffer data to determine I/O traffic congestion on various routing devices linking each replication path from the source storage device to the target storage device.

In embodiments, I/O to storage location mapper 204 is configured to evaluate the data to be replicated to the storage devices. The I/O to storage location mapper 204 may determine a host identity and/or volume identity associated with the data to be replicated and map the data to the proper storage location.

In embodiments, the tiering manager 206 is configured to evaluate the storage type and/or the data to be replicated by classifying the data into one or more data tiers. For example, SSD data may be classified in a faster data tier for replication while HDD and/or nearline storage data may be classified as in a lower or medium data tier. The metadata mapper 208 may detect requirements for synchronous replication for I/O operations coming from a host, evaluate synchronous replication requirements, and/or invoke the replication for upcoming I/O operations.

Once the location for the data is mapped and a data tier determination has been made, the I/O type to link selection logic 210 may determine the proper replication path to be use for replicating the data. Returning to the previous example, because the SSD data is classified in a faster data tier, the I/O type to link selection logic 210 will select a replication path with a high buffer capacity, while lower tier data will be replicated using a lower buffer capacity replication path. In some embodiments, lower tier data may be replicated using the high buffer capacity replication paths in the event that the path is being underutilized for faster data tier replication.

In embodiments, block storage connector 212 is configured to manage replication and storage of data on block storage 230. In embodiments, block storage 230 may comprise a plurality of block storages and is not meant to be limiting. For example, block storage 230 may comprise one or more storage area networks (SANs) and/or one or more cloud-based storage environments.

In embodiments, replication manager 214 is configured to manage and/or initiate replication of data. For example, the replication manager 214 may copy and/or migrate enterprise cloud data between various storage devices. In some embodiments, the replication manager 214 may make determinations on which data is replicated on which replication path based on one or more QoS requirements. In this way, users may pay for faster tier replication to obtain increased data replication performance.

In embodiments, cloud service provider (CSP) interconnect application program interface (API) 216 is configured to provide in-bound or out-of-bound API infrastructure that communicates with a replication service and a base initiator demon. The CSP interconnect API 216 further provides an interface to transmit the RDMA-buffer capacity for the replication paths to the replication layers.

Figure 3:
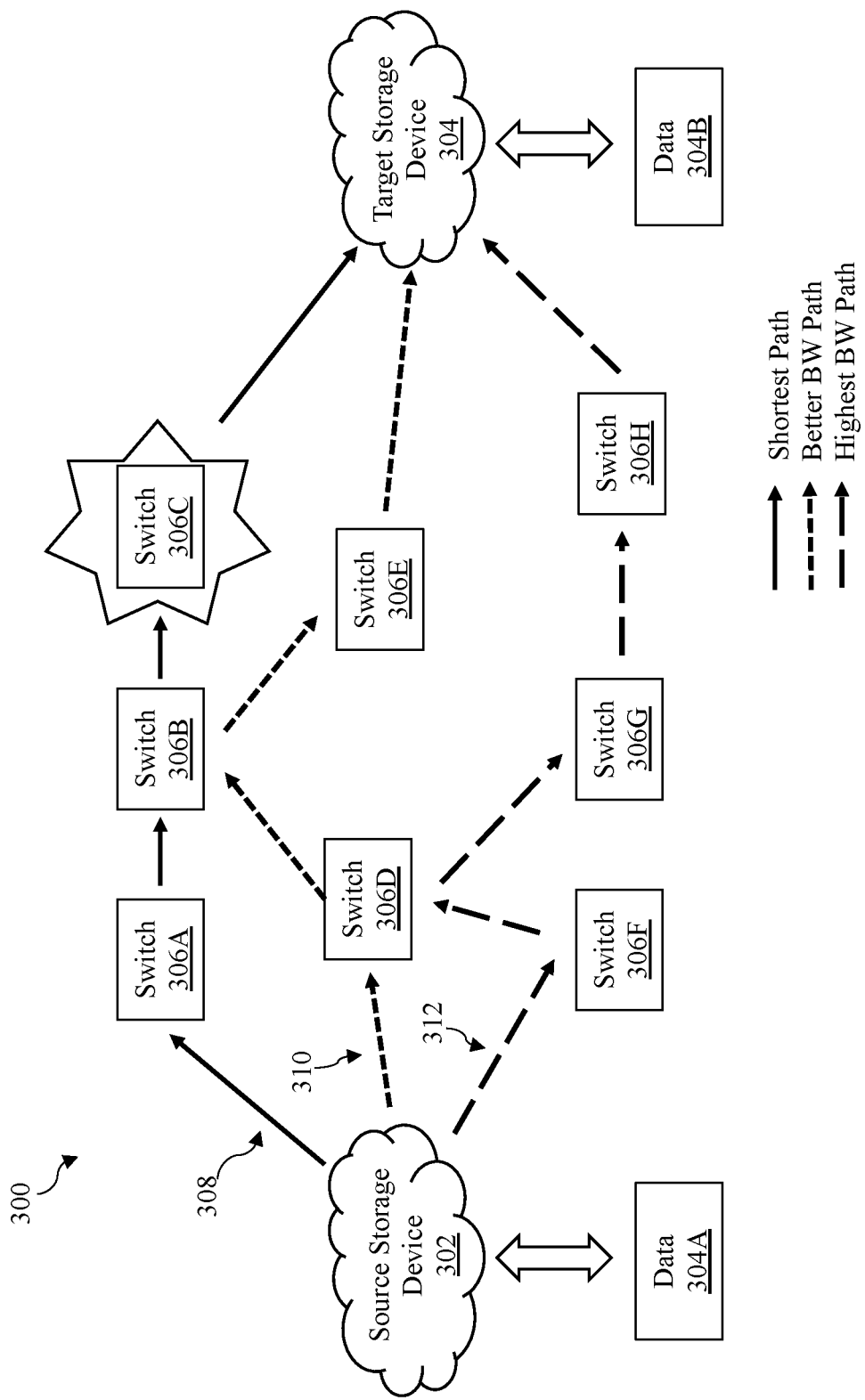
FIG. 3 illustrates an example diagram for selecting a data replication path based on buffer capacity, in accordance with embodiments of the present disclosure.

Referring now to FIG. 3, shown is an example diagram 300 for selecting a data replication path based on buffer capacity, in accordance with embodiments of the present disclosure. In embodiments, source storage device 302 is communicatively coupled to target storage device 304 via replication path 308, replication path 310, and replication path 312. It is contemplated that more or less replication paths may exist, and that this illustration is not meant to be limiting. In embodiments, each replication path is connected via switch 306A-switch 306H (collectively referred to as switch(es) 306). For simplicity purposes, only switches 306A-switch 306H were included on the replication paths, however, other network topologies may employ more or fewer switches and/or other network devices.

In embodiments, source storage device 302 and target storage device 304 may be any type of storage device (e.g., SSD, HDD, nearline storage device, etc.) and may perform I/O read/write operations to replicate data 304A to target storage device 304 as data 304B. Source storage device 302 may utilize a cloud storage engine (e.g., cloud storage engine 120 of FIG. 1 and/or cloud storage engine 200 of FIG. 2) to determine the buffer capacity of each replication path 308, 310, and 312. Using the cloud storage engine, source storage device 302 may determine that replication path 308 may be the shortest path, but has the least amount of available bandwidth by analyzing associated buffer data. Further, by collecting buffer data for replication path 308, it may be determined that switch 306C is congested. For example, the congested switch 306C may be due to multiple I/O workloads by other tenants of a public cloud being sent through the shortest path which may congest the respective switches. Thus, the cloud storage engine will determine that the calculated buffer capacity for replication path 308 is low. On the other hand, the calculated buffer capacity for replication path 310 may be higher than replication path 308 due to a better bandwidth, even though the path may be longer. While, the calculated buffer capacity for replication path 312 may be the highest because it has the most available bandwidth, even though the path contains the most switches 306. This may be due to less congestion because various algorithms for other tenants may be sending I/O workloads via the shortest path (e.g., replication path 308).

In embodiments, once the buffer capacity is determined for each of the replication paths, the cloud storage engine may determine which replication path is used to replicate data 304A. In embodiments, this determination may be based on a data tier. For example, if data 304A is classified in a fast data tier (e.g., SSD data), the replication path 312 which has the highest buffer capacity will be selected. Alternatively, if the data 304A is in a low data tier (e.g., HDD data), the replication path 308 or replication path 310 may be chosen for replication. If the replication path 312 is underutilized the lower tier data can be sent over 312. In this way, using the nature of the data and/or any QoS characteristics, the system can maintain faster replication paths for faster tier services and prevent any unwanted latency issues. Once the appropriate path is selected for the respective tier of data, data 304A may be replicated as data 304B using any type of replication technique (e.g., replicating SSD data packets, HDD data packets, nearline storage data packets, and the like).

Figure 4:
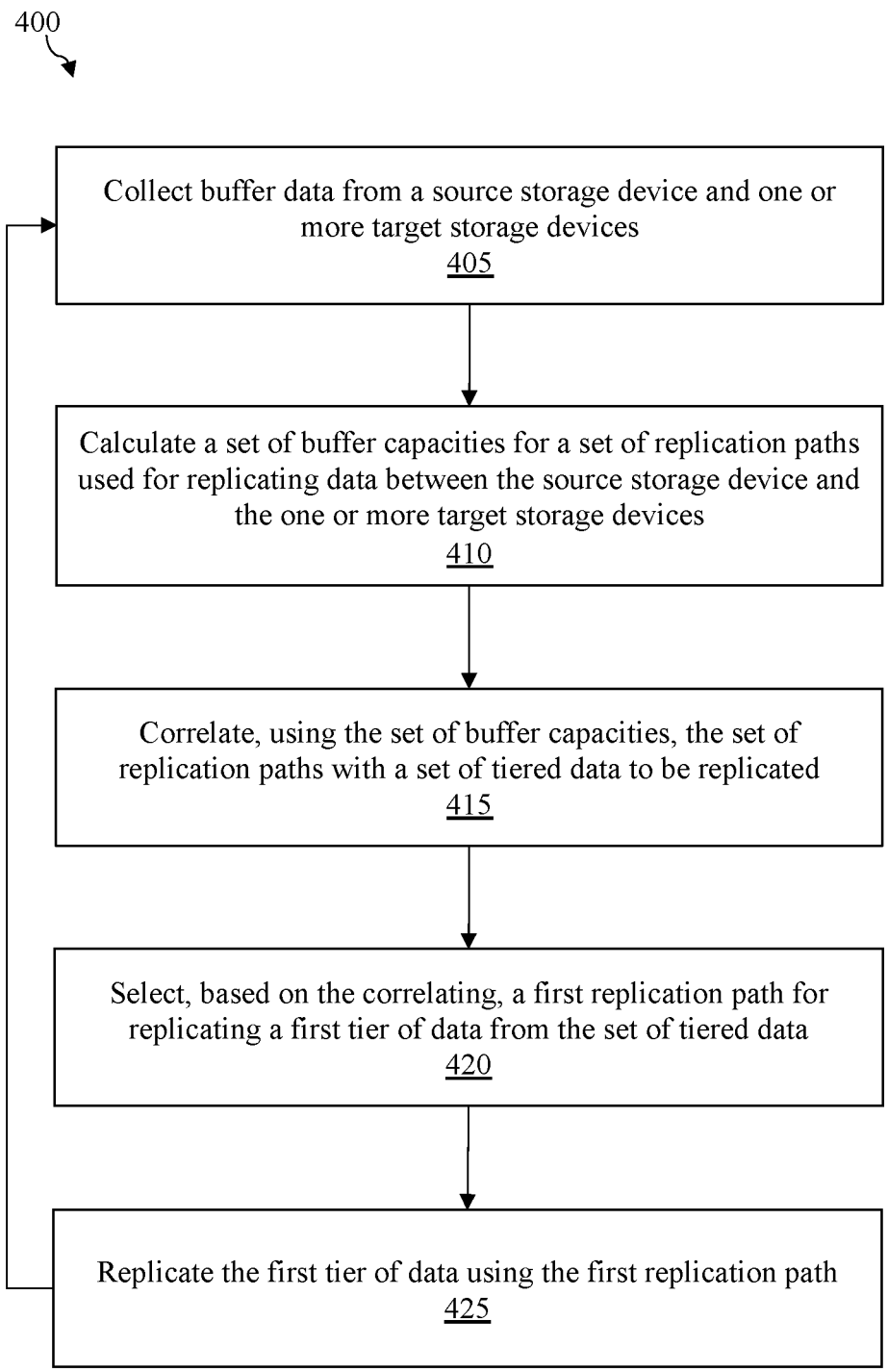
FIG. 4 illustrates a flow diagram of an example process for selecting a data replication path based on buffer capacity, in accordance with embodiments of the present disclosure.

Referring now to FIG. 4, shown is a flow diagram of an example process 400 for selecting a data replication path based on buffer capacity, in accordance with embodiments of the present disclosure. The process 400 may be performed by processing logic that comprises hardware (e.g., circuitry, dedicated logic, programmable logic, microcode, etc.), software (e.g., instructions run on a processor), firmware, or a combination thereof. In some embodiments, the process 400 is a computer-implemented process. The process 400 may be performed by processor 106 and/or processor 116 exemplified in FIG. 1.

The process 400 begins by collecting buffer data from a source storage device and one or more target storage devices. This is illustrated at step 405. The source storage device and the one or more target storage device are communicatively coupled over a network (e.g., cloud computing network). The buffer data may comprise various attributes related a set of replication paths on the network. For example, the buffer data may include an available buffer size, an available buffer speed, and an available buffer bandwidth of a plurality of connections along each of the set of replication paths connecting the source storage device and the one or more target storage devices. The buffer data may include information relating to intermediary components (e.g., switches, other computer systems, etc.) along the various replication paths between the source storage device and the target storage device.

The process 400 continues by calculating, using the buffer data, a set of buffer capacities for the set of replication paths used for replicating data between the source storage device and the one or more target storage devices. This is illustrated at step 410. The set of buffer capacities may be calculated by a cloud storage engine (e.g., cloud storage engine 120 of FIG. 1 and/or cloud storage engine 200 of FIG. 2).

The process 400 continues by correlating, using the set of buffer capacities, the set of replication paths with a set of tiered data to be replicated. This is illustrated at step 415. The set of tiered data is determined by analyzing replication requirements for replicating data. For example, the set of tiered data may correspond to the type of storage device (e.g., SSD, HDD, nearline storage device, etc.) that the data to be replicated is stored on (source) and/or the type of storage device the data is to be replicated to (target). For example, SSD data may be classified as faster tier data, HDD data may be classified as slower tier data, and nearline storage device data may be classified as medium tier data based on the speed in which I/O operations can be performed. The set of tiered data may additionally, or alternatively, be based on QoS requirements for the data.

In embodiments, any faster tier data may be correlated with replication paths that have been calculated as having a higher buffer capacity, while lower and medium tier data may be correlated with replication paths that have been calculated as having lower and medium buffer capacities, respectively.

The process 400 continue by selecting, based on the correlating, a first replication path for replicating a first tier of data from the set of tiered data. This is illustrated at step 420. For example, the cloud storage engine may select a first replication path out of the set of replication paths that has the highest buffer capacity for replicating faster tier data. The cloud storage engine will continue to select and/or match replication paths (e.g., selecting a second replication path for a corresponding second tier of data) with various tiers of data based on buffer capacity as long as there are available replication paths that meet any replication requirements.

Once the first replication path has been selected for replicating the first tier of data, the process continues by replicating the first tier of data using the first replication path to the one or more target storage devices. The is illustrated at step 425. This process may continue for all other tiers of data until replication has finished.

In embodiments, the process 400 may return to step 405 to continuously analyze buffer data to determine if any changes to buffer capacity have occurred. For example, the cloud storage engine may detect a configuration change has occurred on one or more replication paths of the set of replication paths and recalculate the set of buffer capacities for the set of replication paths based on the detected configuration change. In another example, the cloud storage engine may detect I/O traffic congestion has occurred on one or more network switches located on one or more replication paths and recalculate the set of buffer capacities for the set of replication paths based on the detected congestion.

Further, the cloud storage engine may continually receive I/O write requests and determine the appropriate replication path(s) that correlates with the respective data tier(s). In this way, the system automatically and continuously replicates data using up the appropriate resources for the appropriate data storage type which improves data replication performance.

Figures 5A, 5B:
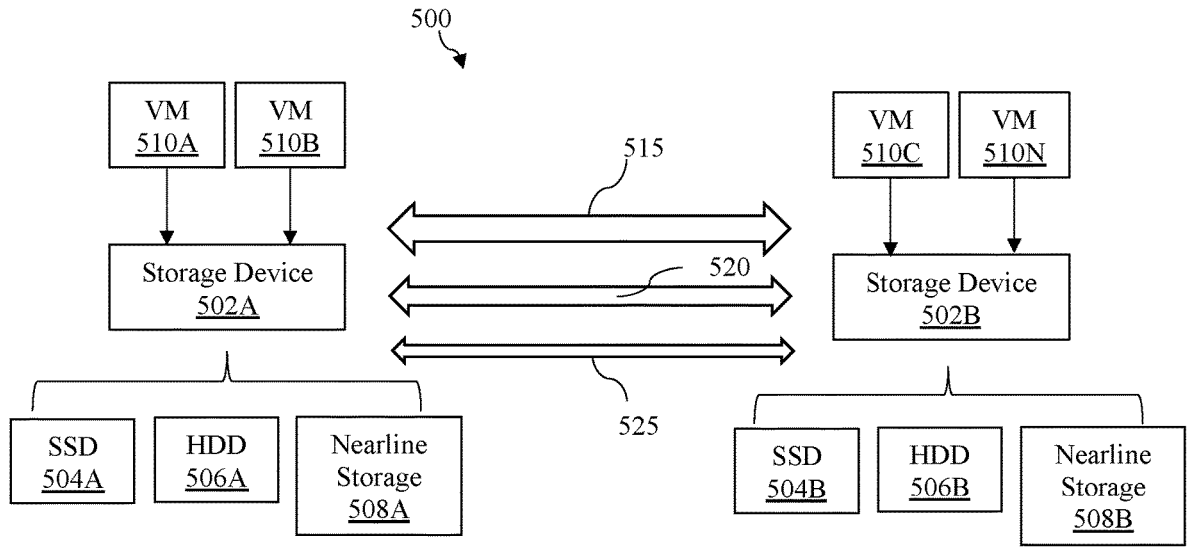
FIG. 5A illustrates a block diagram of a cloud computing environment configured for replicating data based on buffer capacity, in accordance with embodiments of the present disclosure.
FIG. 5B illustrates an example table representing replication path buffer capacity and an example table representing object precedence for data replication, in accordance with embodiments of the present disclosure.

Referring to FIG. 5A, shown is block diagram of a cloud computing environment 500 configured for replicating data based on buffer capacity, in accordance with embodiments of the present disclosure. In the illustrated embodiment, cloud computing environment 500 includes storage device 502A and storage device 502B that are communicatively coupled via replication path 515, replication path 520, and replication path 525. Storage device 502A is communicatively coupled to VM 510 and VM 510B, while storage device 502B is communicatively coupled to VM 510C and VM 510N. Storage device 502A may perform I/O operations requested by VMs 510A-510B according to one or more disk types (or data tiers) as indicated by SSD 504A, HDD 506A, and nearline storage 508A. Similarly, storage device 502B may perform I/O operations requested by VMs 510C-510N according to one or more disk types (or data tiers) as indicated by SSD 504B, HDD 506B, and nearline storage 508B.

Referring now to FIG. 5B, shown is an example table 530 representing replication path buffer capacity and an example table 535 representing object precedence for data replication, in accordance with embodiments of the present disclosure. The replication paths detailed in table 530 correspond to the replication paths shown in FIG. 5A. In embodiments, a cloud storage engine (e.g., cloud storage engine 120 of FIG. 1 or cloud storage engine 200 of FIG. 2) of storage device 502A or 502B may determine the replication path for replication of a data object according to precedence. For example, "Volume_1" is indicated as having a "High" precedence in table 535. Therefore, using the determined buffer capacities listed in table 530, the cloud storage engine of storage device 502A selects replication path 515 for replicating data since it has the highest buffer capacity of 145 MB. For example, replication path 515 may include multiple RDMA based remote copy links comprising different end-to-end buffers from storage device 502A to storage device 502B. In this way, data replication using replication path 515 may utilize more buffer links for transmission for faster tier replication (e.g., SSD).

In another example, "Host_2" is indicated as having "Low" precedence in table 535. Therefore, the cloud storage engine may select replication path 520 or replication path 525 that have lower buffer capacity (e.g., 26 MB or 10 MB, respectively) depending on the data tier (e.g., HDD or Nearline storage). In this way, slower replication links or replication paths with less links may perform slower tier replication. Selecting replication paths based on buffer capacity for various data replication tiers allows the system to perform faster tier data replication with less latency issues when replicating data while still providing data replication for lower or slower tier replication.

Figure 6:
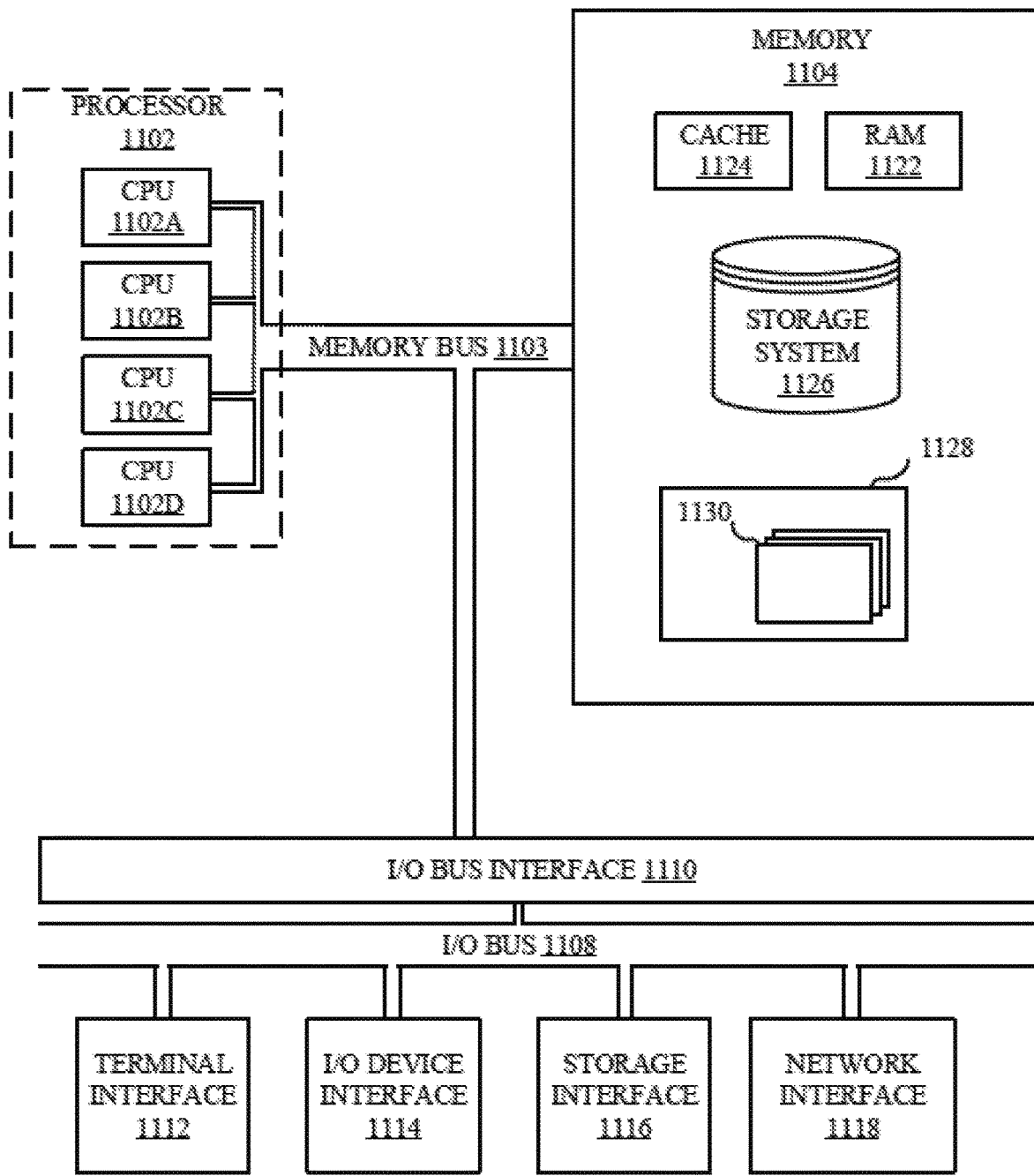
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 400).

System memory subsystem 1104 may include computer system readable media in the form of volatile memory, such as random-access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 6 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 1101. In some embodiments, however, individual components may have greater or lesser complexity than as represented in FIG. 6, components other than or in addition to those shown in FIG. 6 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
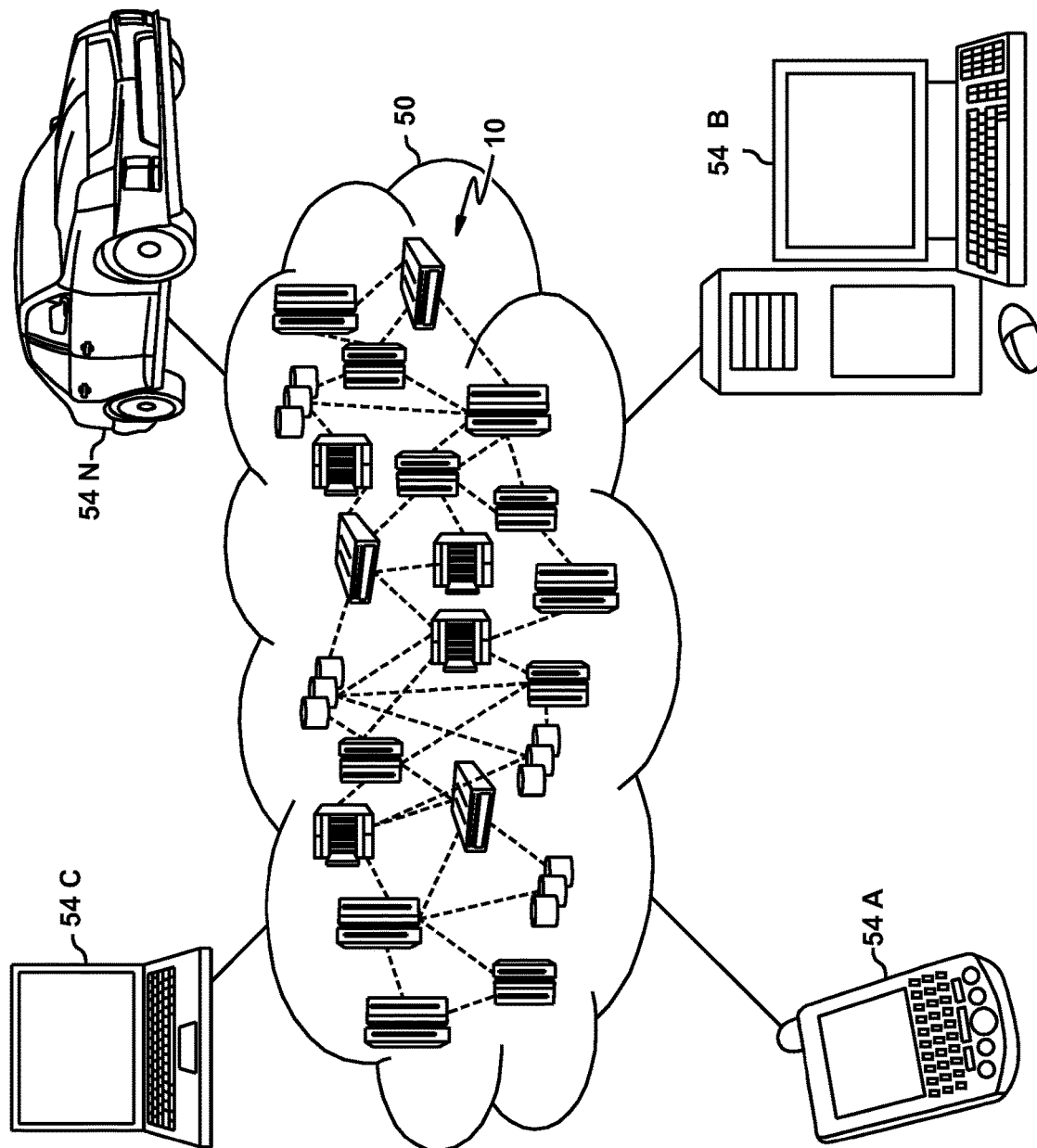
FIG. 7 depicts a cloud computing environment in accordance with embodiments of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
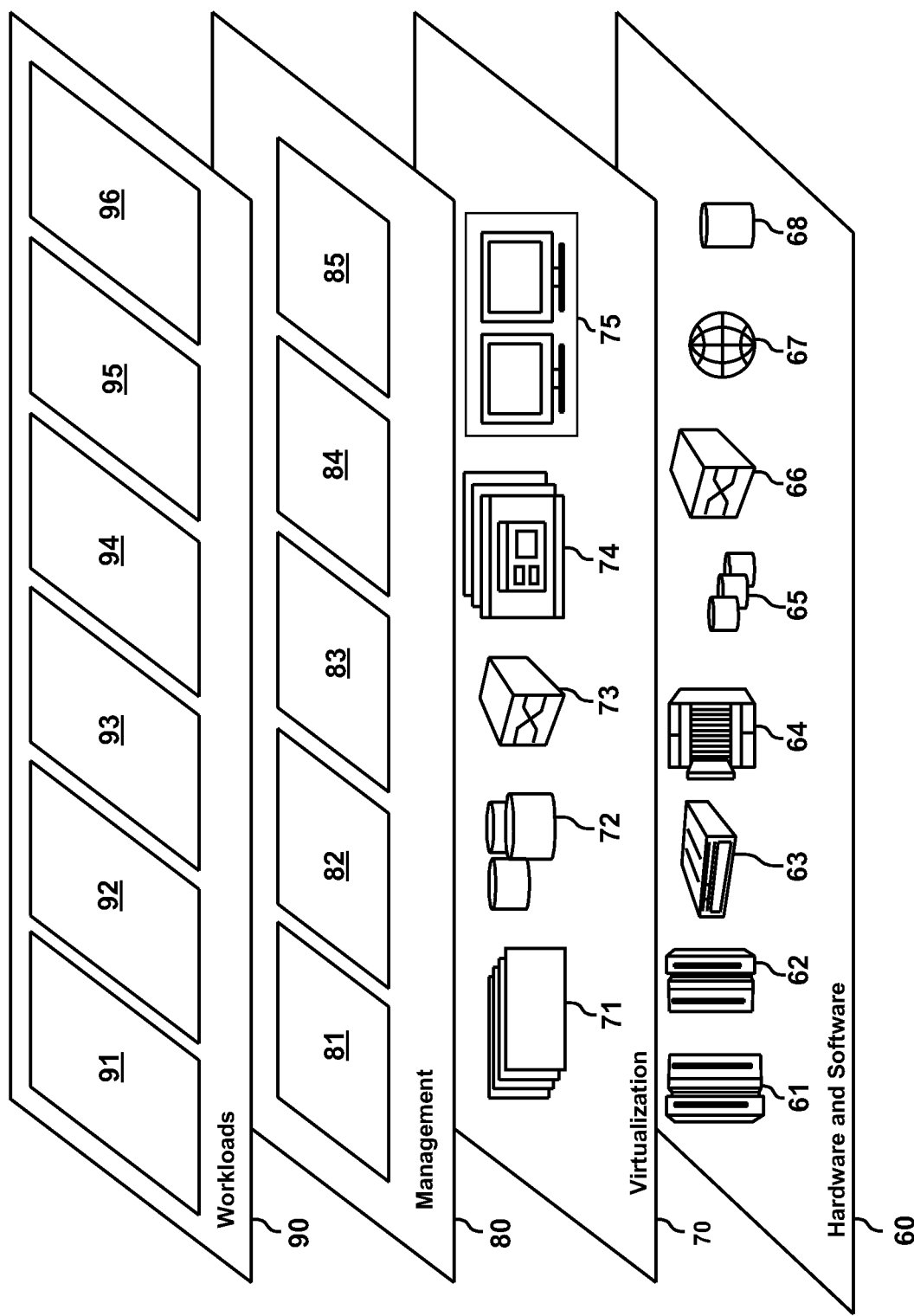
FIG. 8 depicts abstraction model layers in accordance with embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and cloud storage engine software 68 in relation to the cloud storage engine 120 of source storage device 112 illustrated in FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
    collecting buffer data from each replication path of a plurality of replication paths between a source storage device and one or more target storage devices, wherein the source storage device and the one or more target storage devices are communicatively coupled via a network;
    calculating, using the buffer data, a plurality of buffer capacities for the plurality of replication paths used for replicating data between the source storage device and the one or more target storage devices;
    correlating, using the plurality of buffer capacities, the plurality of replication paths with a plurality of tiered data to be replicated, wherein each tier of the plurality of tiered data is classified based on at least one of speed requirements for Input/Output (I/O) operations or Quality of Service (QOS) requirements for the buffer data;
    selecting, automatically and based on the correlating, a first replication path from the plurality of replication paths for replicating a first tier of data from the plurality of tiered data and a second replication path from the plurality of replication paths for replicating a second tier of data from the plurality of tiered data, wherein the first replication path has a higher buffer capacity than the second replication path; and
    upon detecting that at least one of a configuration change or congestion has occurred on one or more replication paths of the plurality of replication paths, recalculating, based on at least one of the configuration change or the congestion, the plurality of buffer capacities for the plurality of replication paths.

2. The computer-implemented method of claim 1, wherein each replication path of the plurality of replication paths includes one or more intermediate devices.

3. The computer-implemented method of claim 2, wherein the one or more intermediate devices are chosen from the group of intermediate devices consisting of: a network router; and a network switch.

4. The computer-implemented method of claim 1, wherein the selecting is performed using a priority adjustment algorithm.

5. The computer-implemented method of claim 4, further comprising:
 detecting that the first replication path is no longer being used to replicate the first tier of data; and
 selecting the first replication path from the plurality of replication paths for replicating a third tier of data from the plurality of tiered data, wherein the third tier of data is a lower tier of data than the first tier of data.

6. The computer-implemented method of claim 1, wherein the buffer data comprises an available buffer size, an available buffer speed, and an available buffer bandwidth of a plurality of connections along each of the plurality of replication paths.

7. The computer-implemented method of claim 1, wherein the first tier of data is solid state drive (SSD) data and the second tier of data is hard disk drive (HDD) data.

8. The computer-implemented method of claim 1, wherein the first replication path is longer than the second replication path.

9. The computer-implemented method of claim 1, wherein the correlating further comprises:
 determining a host identifier associated with the tiered data to be replicated; and
 mapping the tiered data to be replicated to the one or more target storage devices via the plurality of replication paths.

10. The computer-implemented method of claim 1, further comprising:
 correlating, using the recalculated plurality of buffer capacities, the plurality of replication paths with the plurality of tiered data to be replicated, and
 selecting, automatically and based on the correlating using the recalculated plurality of buffer capacities, a third replication path from the plurality of replication paths for replicating the first tier of data from the plurality of tiered data, wherein the third replication path has a higher buffer capacity than the first replication path.

11. A system comprising:
a processor; and
a computer-readable storage medium communicatively coupled to the processor and storing program instructions which, when executed by the processor, cause the processor to perform a method comprising:
 collecting buffer data from each replication path of a plurality of replication paths between a source storage device and one or more target storage devices, wherein the source storage device and the one or more target storage devices are communicatively coupled via a network;
 calculating, using the buffer data, a plurality of buffer capacities for the plurality of replication paths used for replicating data between the source storage device and the one or more target storage devices;
 correlating, using the plurality of buffer capacities, the plurality of replication paths with a plurality of tiered data to be replicated, wherein each tier of the plurality of tiered data is classified based on at least one of speed requirements for Input/Output (I/O) operations or Quality of Service (QOS) requirements for the buffer data;
 selecting, automatically and based on the correlating, a first replication path from the plurality of replication paths for replicating a first tier of data from the plurality of tiered data and a second replication path from the plurality of replication paths for replicating a second tier of data from the plurality of tiered data, wherein the first replication path has a higher buffer capacity than the second replication path; and
 upon detecting that at least one of a configuration change or congestion has occurred on one or more replication paths of the plurality of replication paths,
 recalculating, based on at least one of the configuration change or the congestion, the plurality of buffer capacities for the plurality of replication paths.

12. The system of claim 11, wherein the buffer data comprises an available buffer size, an available buffer speed, and an available buffer bandwidth of a plurality of connections along each of the plurality of replication paths.

13. A computer program product comprising a computer-readable storage medium having program instructions embodied therewith, the program instructions executable by a processor to cause the processor to perform a method comprising:
 collecting buffer data from each replication path of a plurality of replication paths between a source storage device and one or more target storage devices, wherein the source storage device and the one or more target storage devices are communicatively coupled via a network;
 calculating, using the buffer data, a plurality of buffer capacities for the plurality of replication paths used for replicating data between the source storage device and the one or more target storage devices;
 correlating, using the plurality of buffer capacities, the plurality of replication paths with a plurality of tiered data to be replicated, wherein each tier of the plurality of tiered data is classified based on at least one of speed requirements for Input/Output (I/O) operations or Quality of Service (QOS) requirements for the buffer data;
 selecting, automatically and based on the correlating, a first replication path from the plurality of replication paths for replicating a first tier of data from the plurality of tiered data and a second replication path from the plurality of replication paths for replicating a second tier of data from the plurality of tiered data, wherein the first replication path has a higher buffer capacity than the second replication path; and
 upon detecting that at least one of a configuration change or congestion has occurred on one or more replication paths of the plurality of replication paths,
 recalculating, based on at least one of the configuration change or the congestion, the plurality of buffer capacities for the plurality of replication paths.

14. The computer program product of claim 13, wherein the buffer data comprises an available buffer size, an available buffer speed, and an available buffer bandwidth of a plurality of connections along each of the plurality of replication paths.

* * * * *